United States Patent
Ganesan et al.

(10) Patent No.: US 11,915,333 B1
(45) Date of Patent: *Feb. 27, 2024

(54) MOBILE CHECK-IN AND USER VERIFICATION FOR ACCESS TO SECURED AREAS SUCH AS LOUNGES

(71) Applicant: AMERICAN AIRLINES, INC., Fort Worth, TX (US)

(72) Inventors: Venkatasubramanian Ganesan, Irving, TX (US); Krishna Reddy Jeereddy, Flower Mound, TX (US); Alyson Jones, Fort Worth, TX (US); Paul Pacheco, Euless, TX (US); Phillip Easter, Colorado Springs, CO (US); Basil Higgins, Fort Worth, TX (US); John Praveen Caleb Francis, Fort Worth, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,360

(22) Filed: Nov. 10, 2022

Related U.S. Application Data

(63) Continuation of application No. 16/843,593, filed on Apr. 8, 2020, now Pat. No. 11,501,399.
(Continued)

(51) Int. Cl.
*G06Q 50/26* (2012.01)
*G06F 3/0482* (2013.01)
(Continued)

(52) U.S. Cl.
CPC ......... *G06Q 50/265* (2013.01); *G06F 3/0482* (2013.01); *G06F 3/0483* (2013.01);
(Continued)

(58) Field of Classification Search
CPC ... G07C 9/27; G07C 9/38; G07C 9/32; G07C 2209/08; G07C 9/00904; G06F 3/0488;
(Continued)

(56) References Cited

U.S. PATENT DOCUMENTS 7,081,819 B2 * 7/2006 Martinez de Velasco Cortina ..... G06K 7/0008
340/505
2006/0243799 A1 * 11/2006 Kelly ..................... G07C 9/257
235/382

(Continued)

*Primary Examiner* — Congvan Tran
(74) *Attorney, Agent, or Firm* — HAYNES AND BOONE, LLP

(57) ABSTRACT

A method of verifying that a user is authorized to access a secured area via an entry point includes receiving at a first computer and from a user device associated with the user, check-in request information that includes: a membership number associated with the user and a travel event; and a lounge location. The method also includes generating a time stamp for the receipt of the check-in request; verifying that the membership number is a valid membership number; and verifying that the time stamp is within a predetermined window of time. The method also includes sending, in response to the verification, instructions from the first computer to a second computer positioned near the entry point to display a window that includes user information associated with the user.

20 Claims, 11 Drawing Sheets

Related U.S. Application Data

(60) Provisional application No. 62/830,931, filed on Apr. 8, 2019.

(51) Int. Cl.
  *G06F 3/0483* (2013.01)
  *G06F 16/29* (2019.01)
  *G06F 16/9538* (2019.01)
  *G06Q 50/30* (2012.01)
  *G07C 9/32* (2020.01)
  *G07C 9/38* (2020.01)

(52) U.S. Cl.
  CPC .......... *G06F 16/29* (2019.01); *G06F 16/9538* (2019.01); *G06Q 50/30* (2013.01); *G07C 9/32* (2020.01); *G07C 9/38* (2020.01); *G06Q 2240/00* (2013.01)

(58) Field of Classification Search
  CPC ...... G06F 16/9538; G06F 21/31; G06F 16/29; G06F 3/04842; G06F 3/0482; G06F 3/0483; G06Q 50/30; G06Q 50/265; G06Q 2240/00
  See application file for complete search history.

(56) References Cited

U.S. PATENT DOCUMENTS

| | | | |
|---|---|---|---|
| 2007/0198436 A1* | 8/2007 | Weiss | G06F 21/6245 705/75 |
| 2008/0035724 A1* | 2/2008 | Vawter | G06Q 20/20 705/16 |
| 2009/0039155 A1* | 2/2009 | Haddad | G07C 9/27 235/382 |
| 2017/0032485 A1* | 2/2017 | Vemury | G06F 16/9535 |
| 2017/0061405 A1* | 3/2017 | Bryant | G06Q 20/4014 |
| 2017/0308692 A1* | 10/2017 | Yano | G07G 1/14 |

\* cited by examiner

MOBILE CHECK-IN AND USER VERIFICATION FOR ACCESS TO SECURED AREAS SUCH AS LOUNGES

CROSS-REFERENCE TO RELATED APPLICATIONS

This application is a continuation of U.S. application Ser. No. 16/843,593, filed Apr. 8, 2020, which claims the benefit of the filing date of, and priority to, U.S. Application No. 62/830,931, filed Apr. 8, 2019, the entire disclosures of which are hereby incorporated herein by reference.

BACKGROUND

Often, access to a lounge within an airport is restricted to a group of members. Not only is the access restricted to a group of members, but the access is restricted to a specific duration of time for each member. For example, when a member is planning to travel from the airport on a specific date, he or she is granted access to the lounge on that specific date.

Conventionally, when a member desires to enter the lounge, she presents her boarding pass and/or identification to a lounge representative. Based on this information, the lounge representative confirms that the member is a member and that the member is traveling on an upcoming flight. The lounge representative then provides the member a physical key that unlocks a door to the lounge or otherwise allows the member to enter the lounge. Often, the check-in process can be slow and a check-in queue forms. This delays the member from entering the lounge, which is disliked by members. As such, a check-in process that avoids long lines and allows the member to quickly enter the lounge is needed.

DETAILED DESCRIPTION

Figure 1:
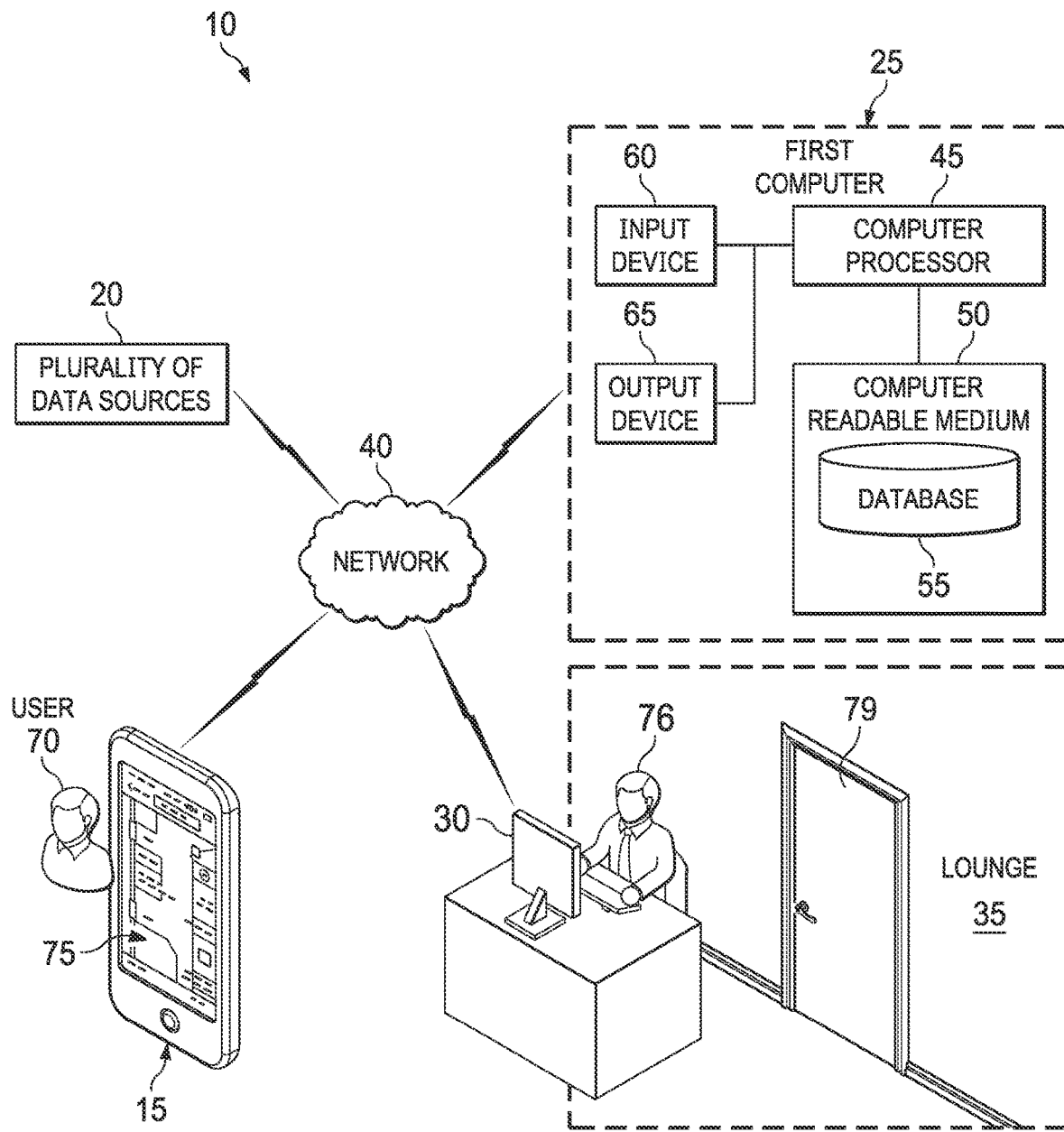
FIG. 1 is a diagrammatic illustration of a system that includes a remote user device, a first computer, and a second computer that is located near a lounge, according to an example embodiment.

In an example embodiment, referring to FIG. 1, a system 10 includes a remote user device 15; a plurality of data sources 20; a first computer 25; and a second computer 30 located at or near a lounge 35, all of which are operably connected via a network 40. In some embodiments, the computer 25 includes a computer processor 45 and a computer readable medium 50 operably coupled thereto. Instructions accessible to, and executable by, the computer processor 45 are stored on the computer readable medium 50. A database 55 is also stored in the computer readable medium 50.

Generally, the computer 25 also includes an input device 60 and an output device 65 with each operably coupled to the processor 45. Generally, the remote user device 15 is associated with a user 70 and has a graphical user interface ("GUI") 75 that can be used to allow the user 70 to electronically check-in to the lounge 35 when the user 70 is a member of a club or otherwise has permission to enter the lounge 35. Generally, the GUI 75 is configured to display a plurality of windows.

In an example embodiment, the system 10 results in a seamless customer experience in that the user 70 checks-in using a mobile application on his or her user device 15 and a photo of the user 70 will be displayed on the computer 30 so that a customer service representative or agent 76 that is near the computer 30 can verify that the person entering the lounge 35 matches the photo displayed on the computer 30. Generally, granting permission for the user 70 to access the lounge 35 occurs at the first computer 25 after the user 70 sends a request from his or her remote user device 15. As no interaction is required by the second computer 30 and the agent 76, the number of users that can be simultaneously granted permission is unlimited. As such, the previous method of sequentially processing and granting permission for a group of users is no longer required. This improves the experience of the user 70 and allows him or her to request permission on demand.

In an example embodiment, the plurality of data sources 20 includes data sources that include data relating to upcoming flight plans of users or customers, flight schedules, flight numbers and origination location and departure destination for each flight number, passenger data, etc.

In one embodiment, the remote user device 15 is similar to the computer 25 in that it includes a computer processor, a computer readable medium, a database, an input device, and an output device. Generally, the input and output device of the remote user device 15 is the graphical user interface 75, but the input device and the output device can also include a speaker, microphone, camera, etc. In several example embodiments, the remote user device 15 is, or includes, a telephone, a personal computer, a tablet, a personal digital assistant, a cellular telephone or mobile phone, other types of telecommunications devices, other types of computing devices, and/or any combination thereof. Additionally, and in one example embodiment, the remote user device 15 is adapted to communicate with a Global Positioning System (GPS) or triangulation system such that the location of the remote user device 15 is automatically detected by the remote user device 15 and/or the computer 25. That is, the remote user device 15 is configured for use with geofencing services and applications.

In one embodiment, the computer 30 is similar to the computer 25 in that it includes a computer processor, a computer readable medium, a database, an input device, and an output device. Generally, the input and output device of the remote user device 30 is a graphical user interface 78 (shown in FIGS. 9 and 10) but can also include a speaker, microphone, camera, etc. In several example embodiments, the computer 30 is, or includes, a desktop computer, a laptop, a telephone, a personal computer, a personal digital assistant, a cellular telephone or mobile phone, other types of telecommunications devices, other types of computing devices, and/or any combination thereof.

In an example embodiment, the lounge 35 is a secured area or at least an area reserved for members and other approved visitors. In some embodiments, the lounge 35 is accessible via an entry point 79 or door that is monitored by the agent 76 that is associated with the computer 30. In some embodiments, the lounge 35 can be any more-secured area relative to a less-secure area or location, such as an airport terminal. An example of a secured area is an area into which entrance is resisted, monitored, restricted, etc. In some embodiments, the agent 76 opens the door 79 to provide entry to the user 70 to the lounge 35 and in other embodiments the agent 76 provides access to the lounge 35 by not refusing the user 70 entry to the lounge 35.

In an example embodiment, the network 40 includes the Internet, one or more local area networks, one or more wide area networks, one or more cellular networks, one or more wireless networks, one or more voice networks, one or more data networks, one or more communication systems, and/or any combination thereof.

Figure 2:
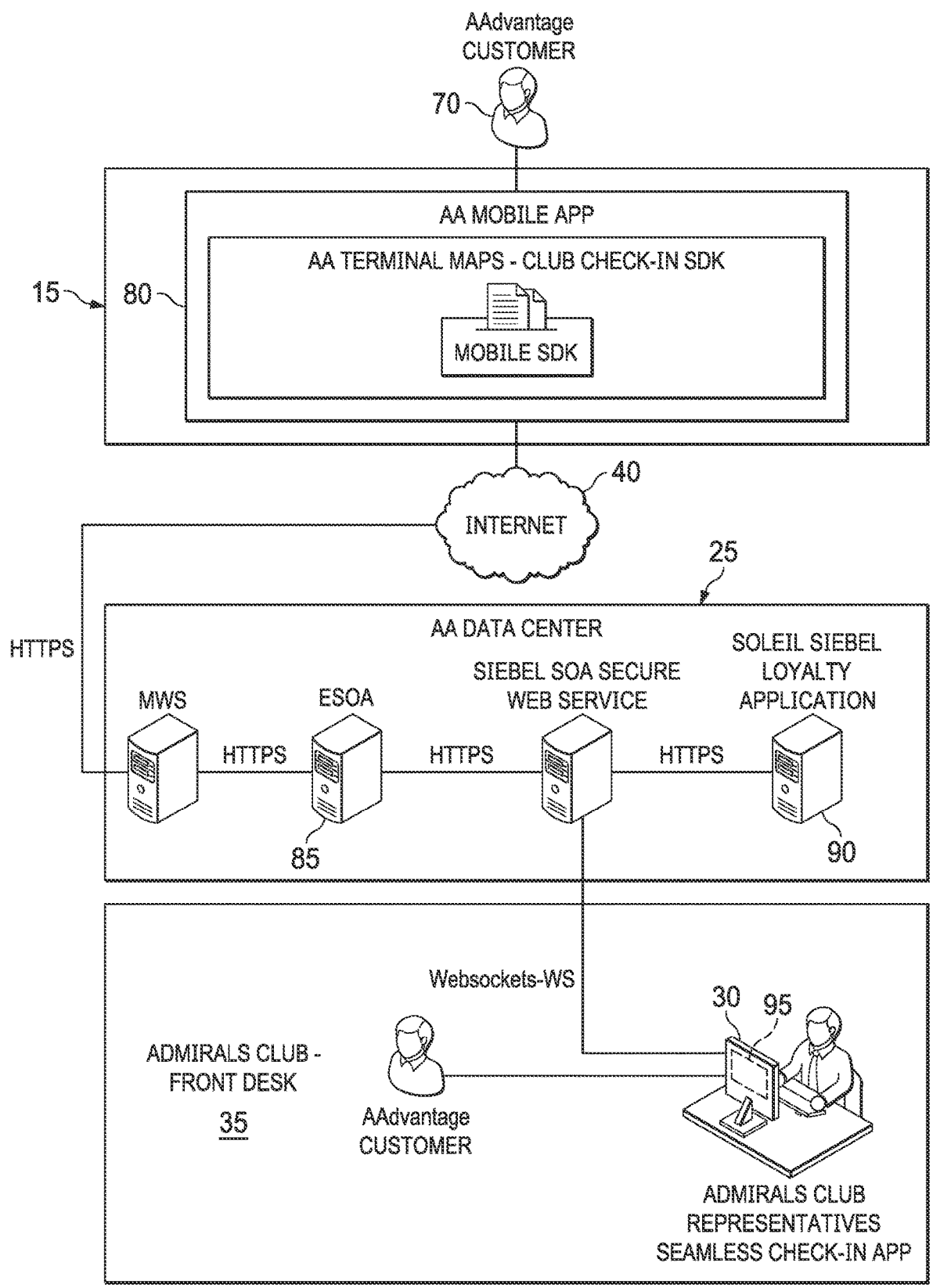
FIG. 2 illustrates a high level conceptual architecture associated with the system of FIG. 1, according to an example embodiment.

FIG. 2 illustrates a high level conceptual architecture associated with the system 10, according to an example embodiment. As illustrated, an application 80 is stored within the remote user device 15. In some embodiments, the application 80 is stored in the computer readable medium of the remote user device 15. In an example embodiment, the application 80 is a "stand alone" application in that it is a mobile application that is downloaded onto the remote user device 15 for the purpose of connecting to the computer 25. Generally, the application 80 displays a plurality of windows on the GUI 75 of the remote user device 15. For example, the application 80 can provide a prompt on the GUI 75 so that the user 70 is prompted to enter his or her user identification and password using the input device of the remote user device 15. The user identification and password are sent to the computer 25 for authentication and/or the remote user device 15 authenticates the user identification and password. In some embodiments, an ("ESOA") authentication 85 authenticates the user identification and password. However, the user name and password can be replaced with a fingerprint, a facial scan, or an eye scan, and the remote user device 15 is capable of capturing and recording a fingerprint, facial scan, or eye scan. In some embodiments, the computer 25 is in communication with a Soleil application 90, which provides travel details and user details associated with the user 70. In some embodiments, the travel details and user details are associated with an upcoming flight. However, the travel details and the user details can include any type of information. For example, the travel details and the user details may include the passenger name record ("PNR"), etc. As the Soleil application 90 and/or the ESOA application 85 may be stored in the computer 25, the application 80 uses the network 40 to communicate with the computer 25. In some embodiments, the application 80 includes a map module that can display a map on a window displayed on the GUI 75 of the remote user device 15. For example, the map module can display a map of a terminal on a window of the GUI 75. As illustrated in FIG. 2, an application is stored within the computer 30. In some embodiments, the application 95 is similar to the application 80 in its ability to communicate via the network 40 with the computer 25. In some embodiments, the application 95 is a Seamless Check-in application that is configured to display a plurality of windows on the GUI 78 (shown in FIGS. 9 and 10) of the computer 30. In some embodiments, the application 95 is configured to display a photo and/or user data associated with the user 70 on the GUI 78 of the computer 30.

Figure 3A:
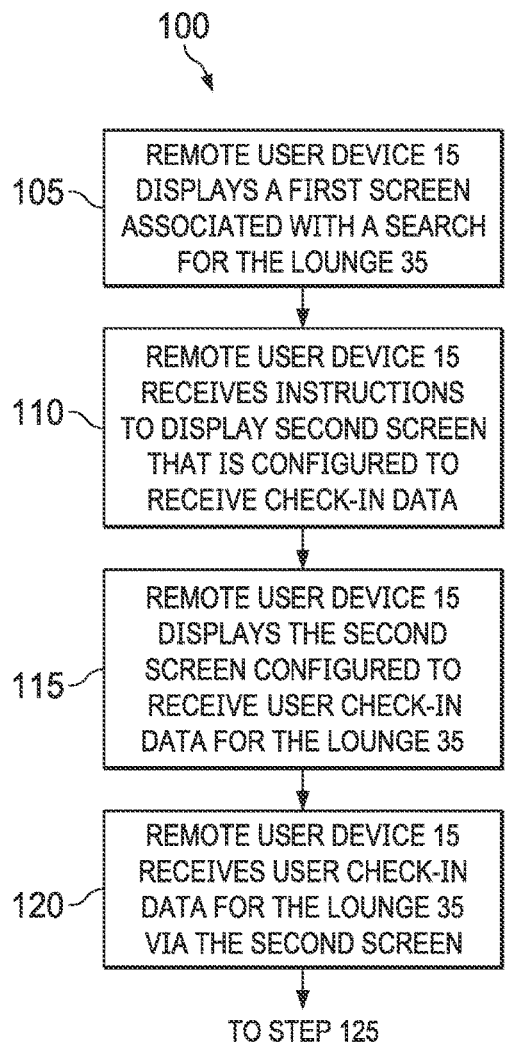
FIGS. 3A and 3B together form a flow chart illustration of a method of operating the system of FIG. 1, according to an example embodiment.
Figure 3B:
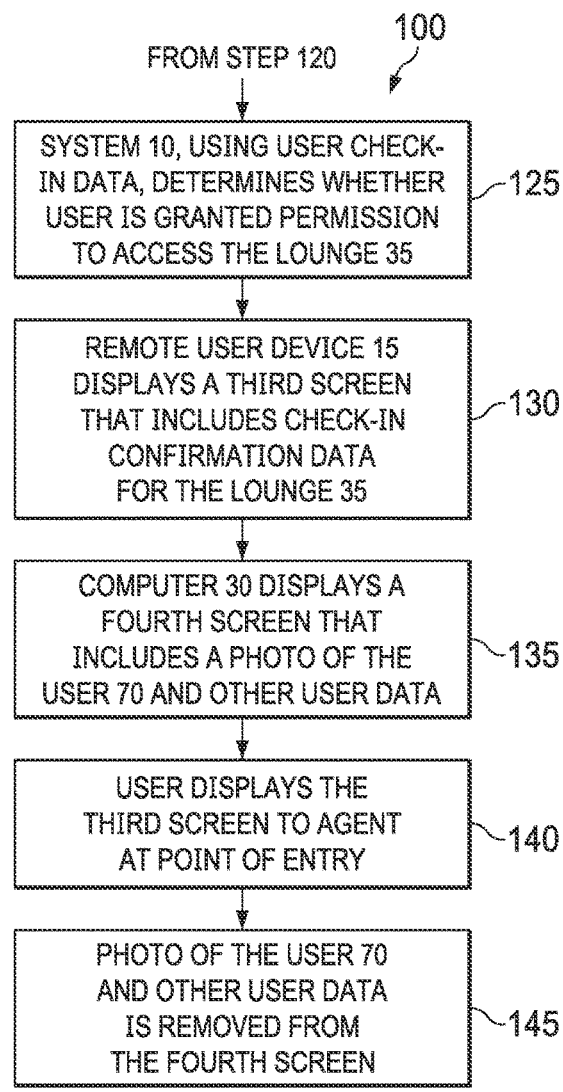

FIGS. 3A and 3B together illustrate a method 100 of granting access to the lounge 35 using the system 10. The method 100 includes the remote user device 15 displaying a first window associated with a search for the lounge 35 at step 105; the remote user device 15 receiving instructions to display a second window that is configured to receive check-in data at step 110; the remote user device 15 displaying the second window that is configured to receive the user check-in data for the lounge 35 at step 115; the remote user device 15 receiving the user check-in data for the lounge 35 via the second window at step 120; the system 10 determining whether the user is granted permission to access the lounge 35 using the user check-in data at step 125; the remote user device 15 displaying a third window that includes check-in confirmation data for the lounge 35 at step 130; the computer 30 displaying a fourth window that includes a photo of the user and/or user data at step 135; the user 70 displaying the third window to the agent at the point of entry 79 at step 140; and removing the photo of the user 70 and user data from the fourth window at the step 145.

Figure 4:
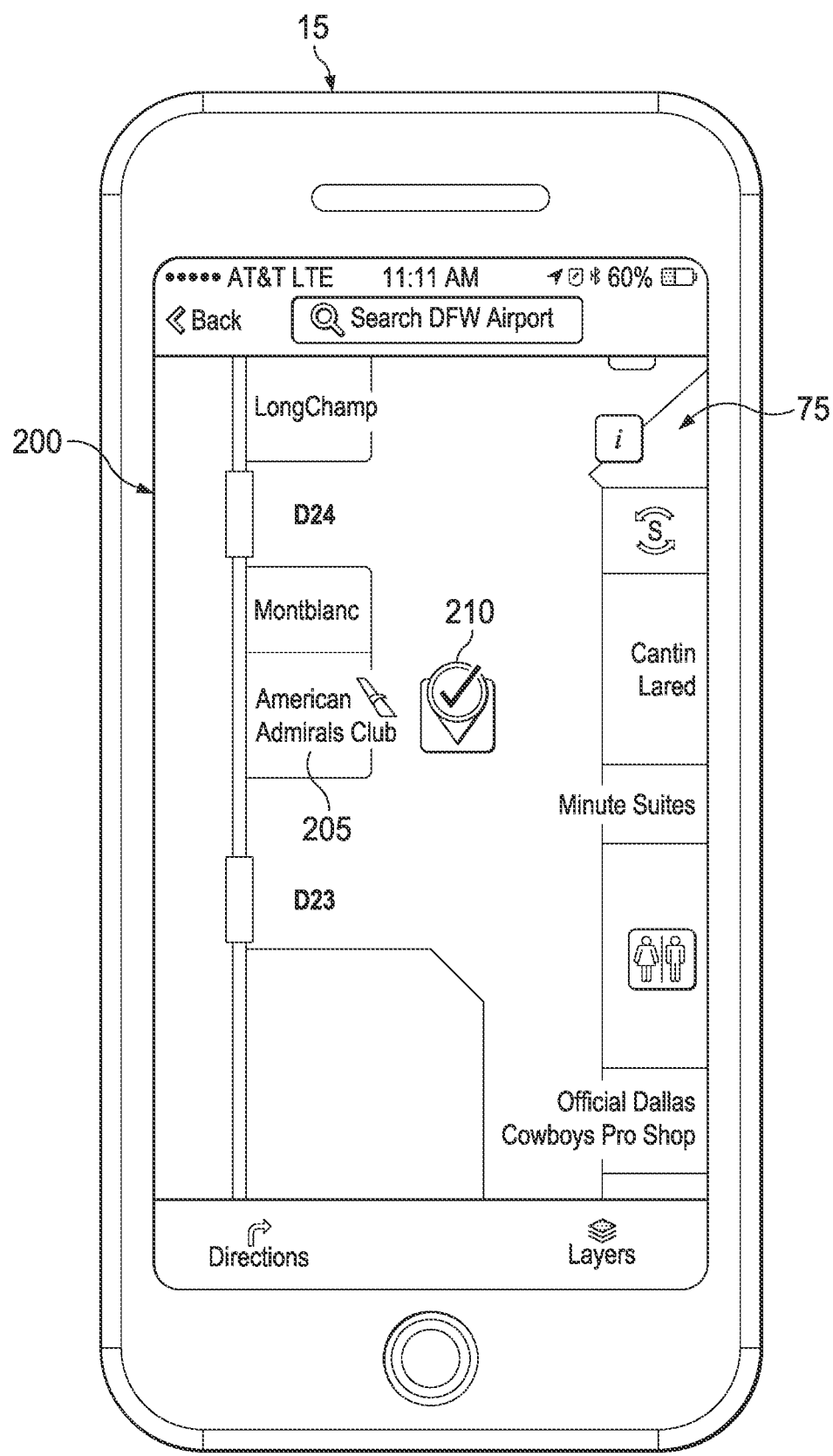
FIG. 4 is an illustration of the remote user device of FIG. 1, according to an example embodiment, the remote user device including a graphical user interface that is displaying a window.

At the step 105 and as illustrated in FIG. 4, the remote user device 15 and/or the application 80 displays a first window 200 associated with a search for the lounge 35. Generally, the first window is generated by the application 80 and displayed on the GUI The first window 200 includes an illustration or map of a portion of a terminal that includes a representation 205 of the lounge 35. As illustrated, the representation 205 of the lounge 35 is positioned relative to other locations and stores near the lounge 35. In one embodiment, the first window 200 includes a selectable button 210 such as including a check mark near the representation 205 of the lounge 35. The selectable button 210 is selectable, and selecting the button 210 opens a window 220 (illustrated in FIG. 6) that is associated with the lounge 35 and/or a mobile check in process for the lounge 35. In some embodiments, the application 80 displays the first window 200 upon notification, based on the GPS capabilities of the remote user device 15, that the remote user device has come within a predetermined distance from the lounge 35. That is, the user 70 can be prompted to check-in using GeoFencing. In some embodiments, the ability to request check-in is dependent upon the user 70 being within a specific distance of the lounge 35 and/or at least within an airport in which the lounge 35 is located. In some embodiments, the application 80 displays directions to the user 70 to the lounge 35 or other instructions on how to access the lounge 35. In some embodiments, the user 70 can map his or her course to the lounge 35 using the application 80 and GeoFencing.

Figure 5:
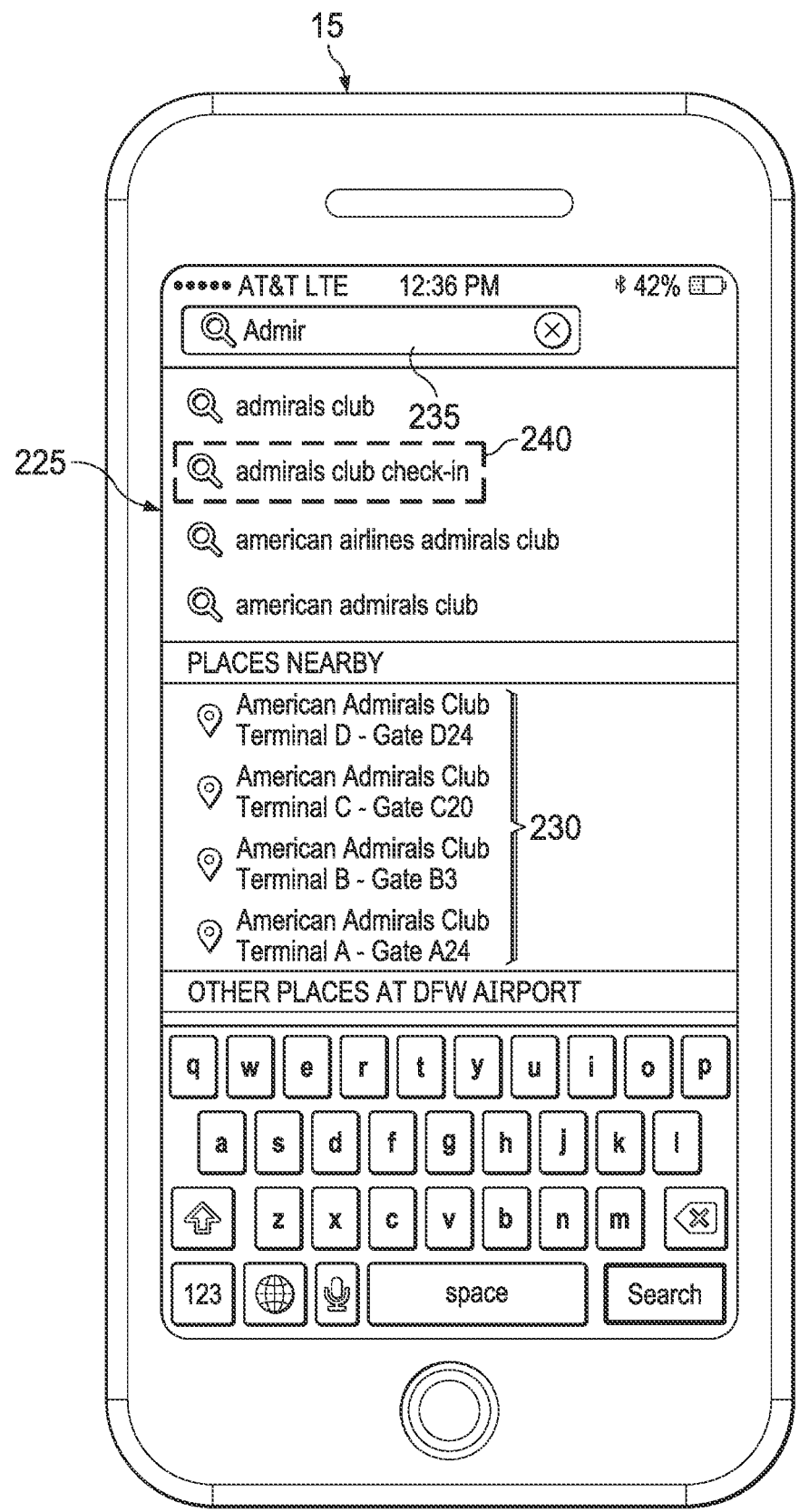
FIG. 5 is an illustration of another embodiment of the window of FIG. 4, according to an example embodiment.

Another example of the first window is identified by the reference numeral 225 in the FIG. 5. The first window 225 is a listing 230 of search results when the remote user device 15 receives search terms. That is, the user can search for a mobile check-in "location" using a text box 235 that is configured to receive search terms. As illustrated, the text box 235 has received the text "Admir" and the application 80 is displaying on the first window 225 the listing 230 of locations and a check-in location, such as "admirals club check-in." Selecting the option of "admirals club check-in" 240 results in the window 220 being displayed on the GUI 75.

At the step 110, the remote user device 15 receives instructions to display a second window that is configured to receive check in data, such as the window 220. Generally, the instructions to display the second window or window 220 includes selecting the selectable button 210 of the window 200 and/or selecting the option of "admirals club check-in" 250 of the window 225. However, the step 110 can include an audible command (received via a microphone of the remote user device 15) to remotely check-in to the nearest lounge. As such, there are a variety of ways that the remote user device 15 receives instructions to display the window 220.

Figure 6:
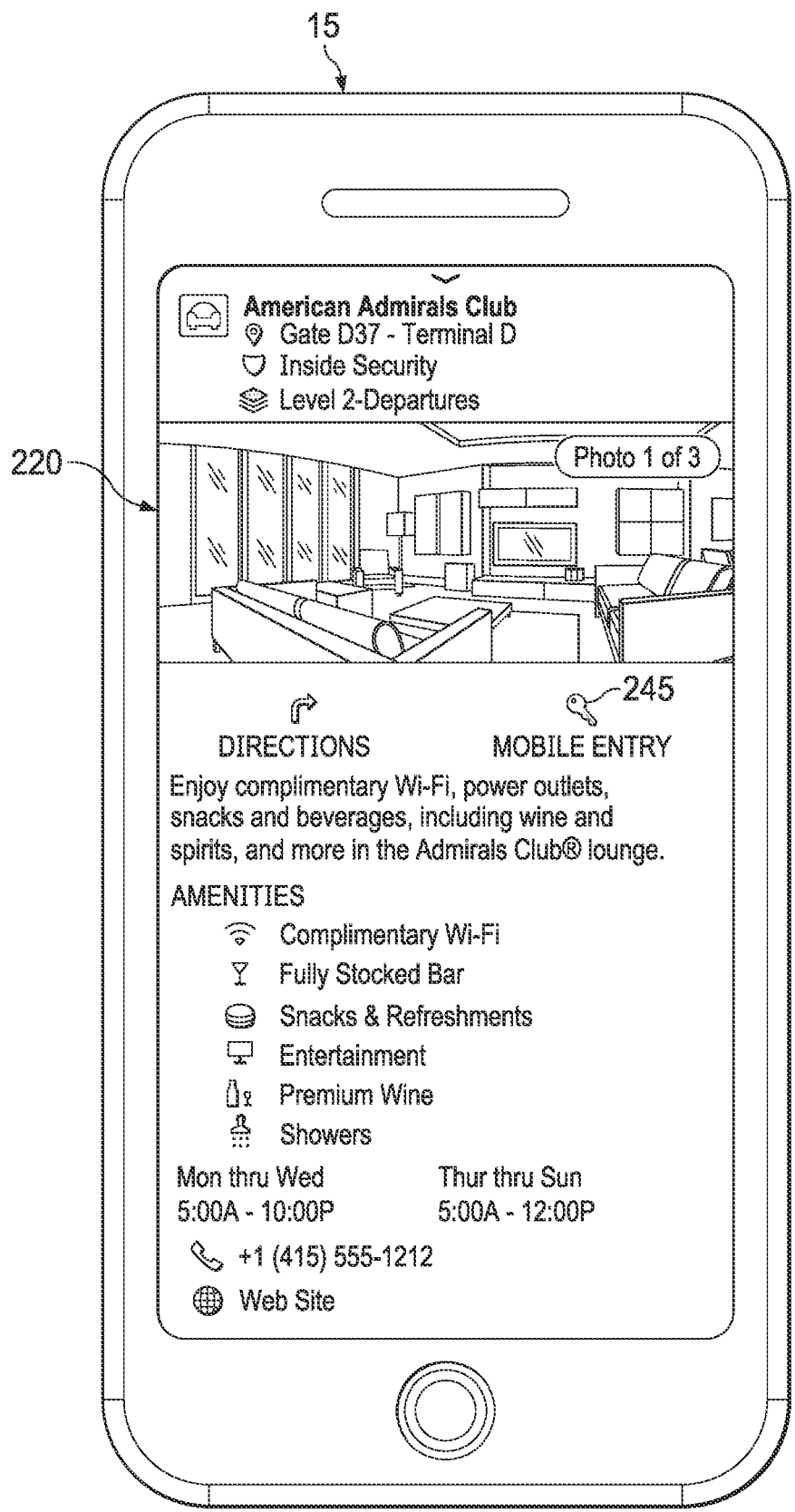
FIG. 6 is an illustration of yet another embodiment of the window of FIG. 4, according to an example embodiment.

During the step 115, the remote user device 15 displays the window 220, which is illustrated in FIG. 6. In some embodiments, the window 220 provides information regarding the lounge 35, such as operating hours, amenities, location, etc. In some embodiments, the window 220 includes a selectable tab 245 that, in this example, is labeled "Mobile Entry" with an illustration of a key. Regardless of the label or accompanying illustration, the selection of the selectable tab 245 provides instructions to the application 80 and/or the remote user device 15 to display another window 250 (illustrated in FIG. 7) on the GUI 75. In some embodiments, the selection of the tab 245 results in the remote user device 15 receiving instructions to display the window 250.

Figure 7:
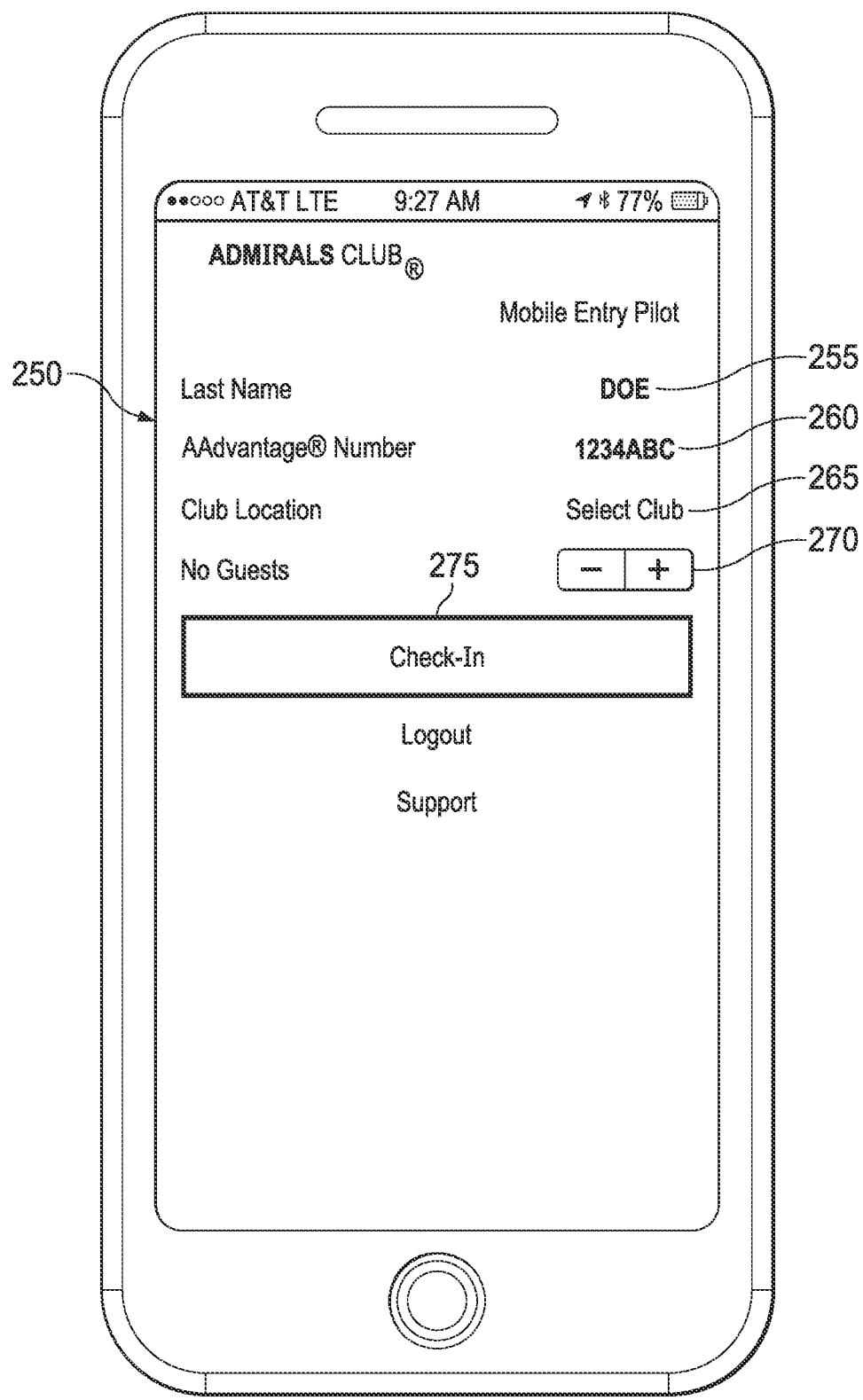
FIG. 7 is an illustration of yet another embodiment of the window of FIG. 4, according to an example embodiment.

At the step 115, the window 250 is displayed on the GUI 75. As illustrated in FIG. 7, the window 250 is configured to receive check-in data that is associated with the user 70. The window 250 includes a last name 255 of the user 70, the advantage number 260 or other membership number of the user 70, a club location input mechanism 265, an input mechanism for a number of guests 270 and a "check-in" button 275. In some embodiments, the last name 255 and the advantage number 260 are prepopulated based on the login and password previously provided to the application 80. In some embodiments, the club location is prepopulated based on the GPS capabilities of the remote user device 15. That is, the window 250 prepopulates the nearest lounge 35 in the window 250 based on the location of the remote user device 15.

At the step 120, the remote user device 15 receives the user check-in data for the lounge 35 via the window 250. That is, the user can use the input mechanisms to input the number of guests that will accompany the user 70 and/or select the lounge 35 location. In some embodiments, the selection of the "check-in" button 275 creates a request or query that is sent from the remote user device 15 to the computer 25. In some embodiments, the request or query also includes a time stamp associated with the time at which the "check-in" button 275 was selected. That is, the request or query can include the membership number of the user 70, the number of guests that will accompany the user 70, the location of the lounge 35, and a time stamp associated with the request.

Figure 8:
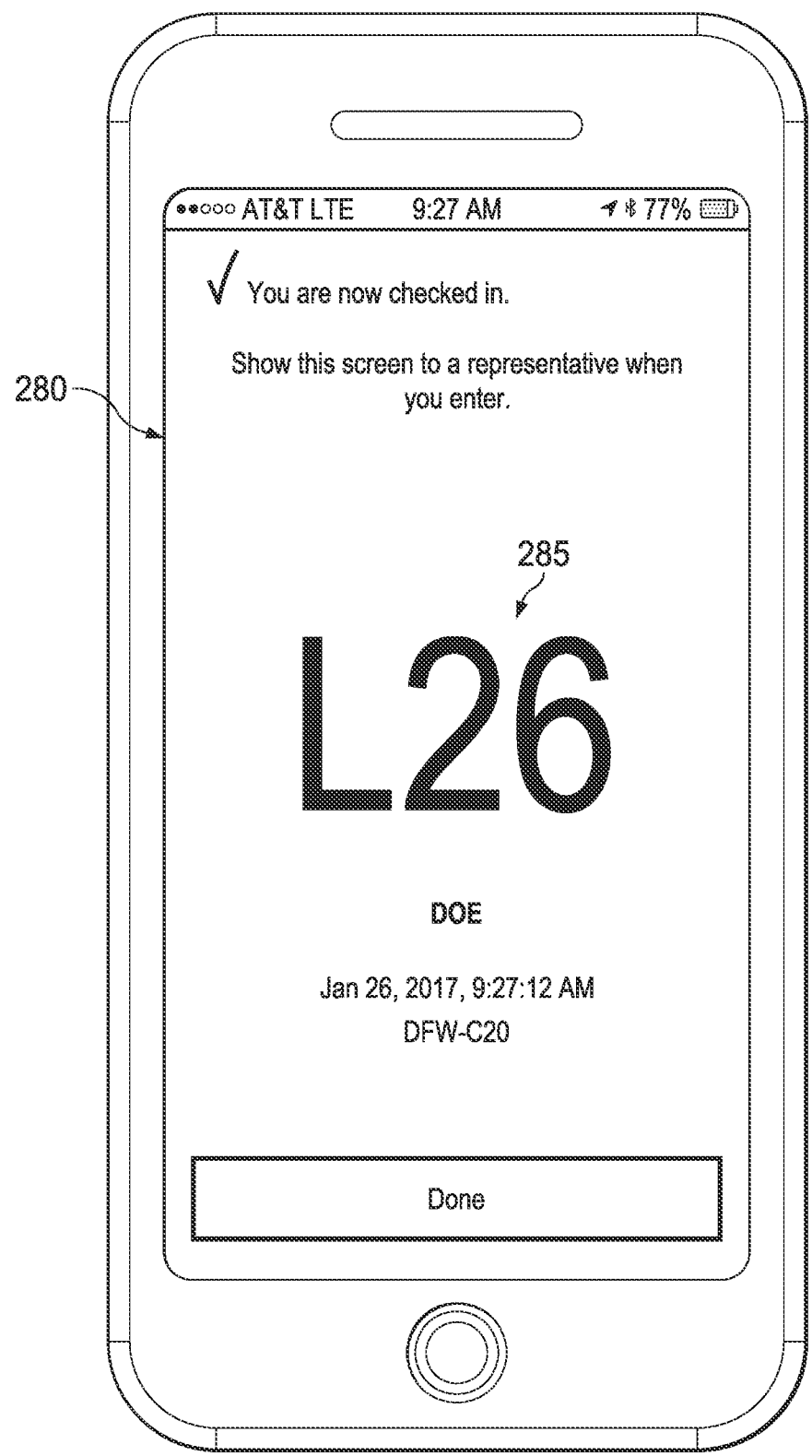
FIG. 8 is an illustration of yet another embodiment of the window of FIG. 4, according to an example embodiment.

At the step 125, the system 10 determines whether the user 70 is granted permission to access the lounge 35. Generally, the determination depends on the timing of the request and the travel plans associated with the user 70. Generally, the check in data or query is sent to the computer 25 to determine whether the user 70 should be granted access to the lounge 35. In some embodiments, the user 70 is granted access to the lounge 35 when the user 70 is a member or otherwise approved to enter the lounge 35 and is waiting on a flight departing from the airport in which the lounge 35 is located. As such, the system 10 determines whether the user 70 is a member, and also determines whether the user 70 is waiting on a flight departing from the airport in which the lounge is located. In some embodiments, the system 10 refers to travel details provided by the plurality of data sources 20 to locate any upcoming flight. The system 10 then determines if the upcoming flight is departing from the airport in which the lounge 35 is located and if the departure time is within a predetermined period of time from the attempted check-in associated with the time stamp in the query. That is, in some embodiments, the user 70 is granted access to the lounge 35 for two hours before the departure time of an upcoming flight or two hours from the boarding time of an upcoming flight. The period of time is not required to be two hours and the period of time can change based on the location, a level of membership, etc. As such, the computer 25 and/or the system 10 compares the time stamp associated with the query to the scheduled boarding time or scheduled flight time to determine whether the query is received within the predetermined period of time. In some embodiments, the user 70 must be waiting on departure of a flight and cannot access the lounge 35 after arriving at his or her destination. However, in other embodiments a user 70 is granted access to the lounge 35 for a period of time after arriving at his or her destination, and this can be dependent upon the level of membership, etc. Generally, verifying that the user 70 is granted permission to access the lounge 35 includes verifying that the membership number is a valid membership number; verifying that the departure location is associated with the lounge location; and verifying that the time stamp is within a window of time prior to the scheduled departure time At the step 130, the remote user device 15 displays a third window that includes check-in confirmation data for the lounge 35. When the system 10 determines that the user 70 is eligible to access the lounge 35, the third window, or window 280 illustrated in FIG. 8, is displayed on the GUI 75. In some embodiments, the window 280 includes a confirmation identifier 285. As illustrated in FIG. 8, the confirmation identifier 285 is a short letter and number combination. However, the confirmation identifier can be any symbol, color, video, etc. that is shown on the window 280.

Figure 9:
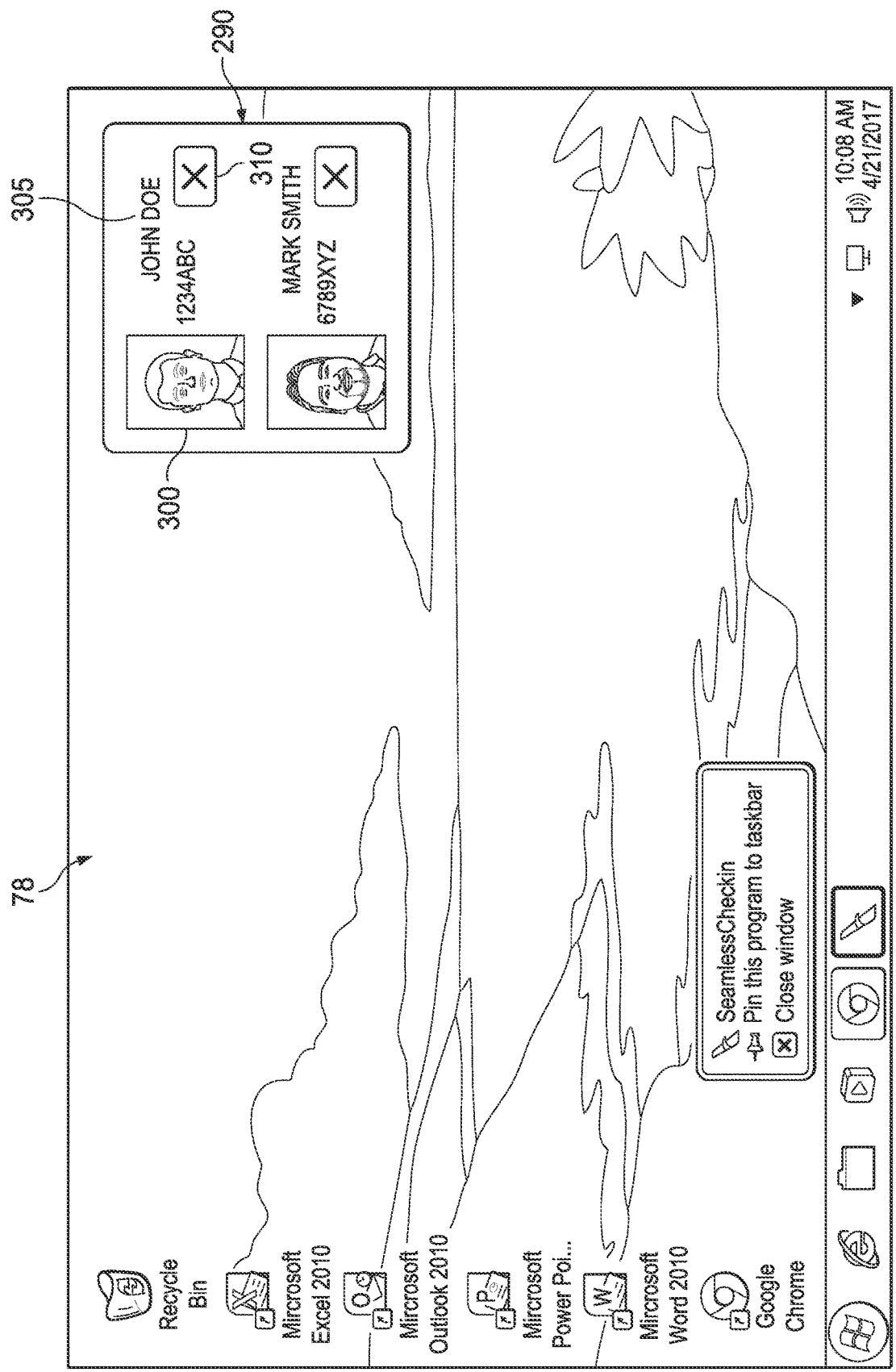
FIG. 9 is an illustration of an embodiment of a window displayed on a graphical user interface of the second computer of FIG. 1, according to an example embodiment.

At the step 135, the computer 30 displays a fourth window or a window 290 on the GUI 78 of the computer 30 as illustrated in FIG. 9. The window 290 includes a photo 300 of the user 70 and user data 305. Simultaneously with or after the step 130, the system 10 causes the window 290 to be displayed on the GUI 78. Generally, the GUI 78 is similar to the GUI 75 in that the GUI 78 is configured to display a plurality of windows. As illustrated in FIG. 9, the photo 300 of the user 70 is included in the window 290 as well as the user data 305. The user data 305 may include an advantage number, a name, etc. In some embodiments, the window 290 also includes input buttons 310 that, upon selection, remove the photo 300 of the user 70 and the user data 305 from the window 290. As illustrated in FIG. 9, information (e.g., photo of the user and/or user data) relating to more than one user can be displayed simultaneously on the window 290, therefore allowing more than one user to check-in simultaneously. As illustrated, the photo and user data for a user named "Mark Smith" is also displayed on the window 290. Each user can be associated with one input button so that the user information associated with a user can be removed from the window upon selection of the input button while allowing user information associated with other users to remain on the window 290. The agent 76 viewing the computer 30 is capable of viewing the window 290 and the photo 300 of the user 70 to visually confirm that a person attempting to enter the lounge 35 is the user 70. Generally, the application 95 displays the window 290 on the GUI 78 of the computer 30. As illustrated, the window 290 is a pop-up window that only covers a small portion of the GUI 78 of the computer 30, such that the agent 76 can be working on other items while the window 290 is displayed. Although each of the photos 300 in FIG. 9 includes a censor bar (or black bar or censor box) masking the identity of a human face, in operation the photo 300 would not include the censor bar. In several embodiments, the photo 300 is, includes, or is part of, any type of image or rendering that resembles the user in some way. The photo 300 may be, for example, any type of digital image of the user or the face of the user, a stylized electronic drawing of the user or the face of the user, a pixelated image of the user or the face of the user, a vector illustration of the user or the face of the user, or any combination thereof.

At the step 140, the user 70 shows the third window or the window 280 to the agent 76 that is located at the point of entry 79 to the lounge 35. As the window 280 includes a confirmation identifier 285, the agent 76 can quickly verify that the user approaching the point of entry 79 is authorized to enter the lounge 35. In some embodiments, the confirmation identifier 285 forms a portion of the other user data 305 displayed on the window 290. Thus, the agent 76 can quickly match the confirmation identifier 285 displayed on the window 280 and a confirmation identifier displayed on the window 290. When the user 70 approaches the computer 30 and/or the point of entry 79 to the lounge 35, the agent 76 can greet the user 70 by name using the photo 300 and the other user data 305 to improve the experience of the user 70.

Figure 10:
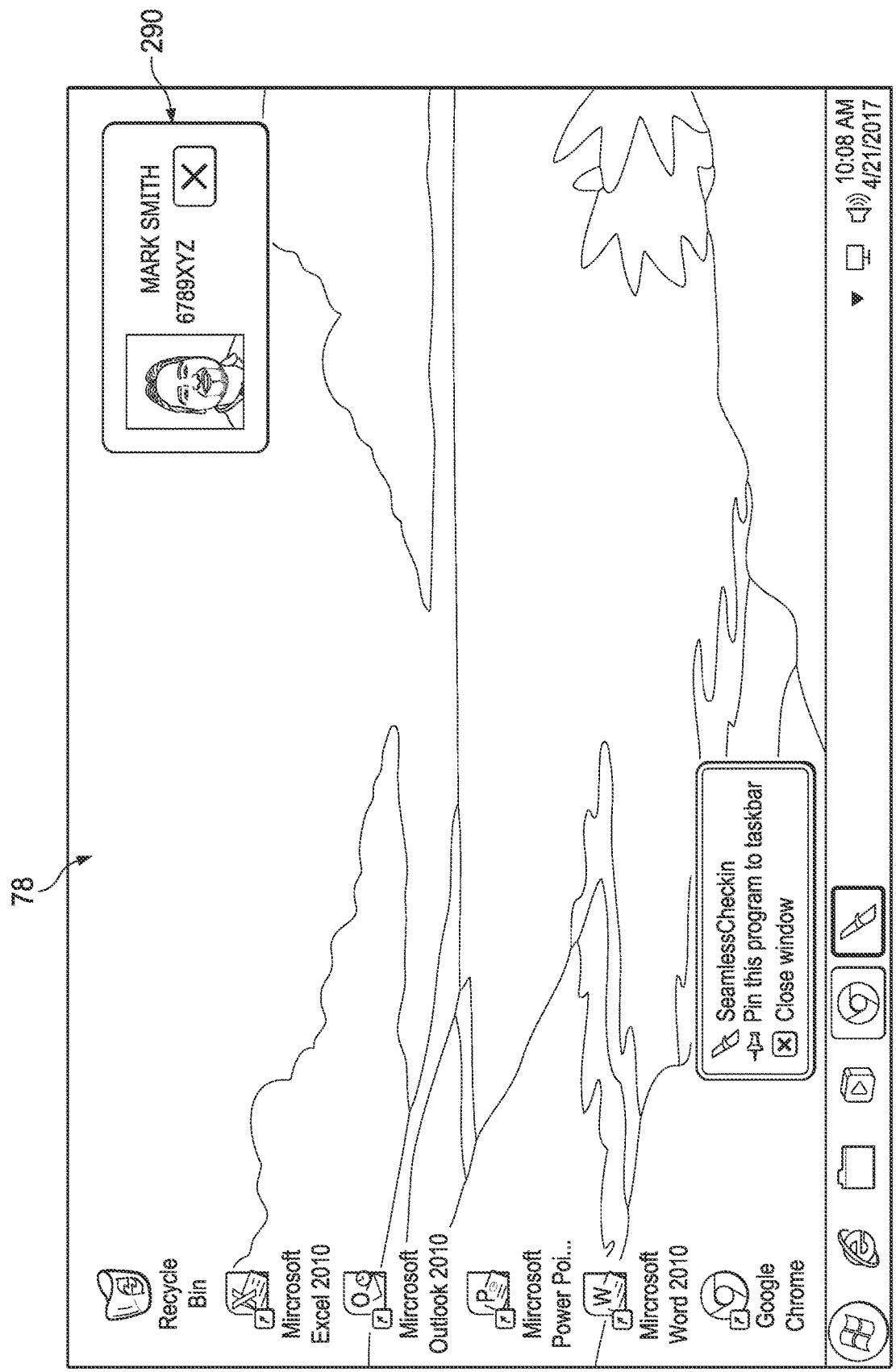
FIG. 10 is an illustration of another embodiment of the window displayed on the graphical user interface of FIG. 9, according to an example embodiment.
Figure 11:
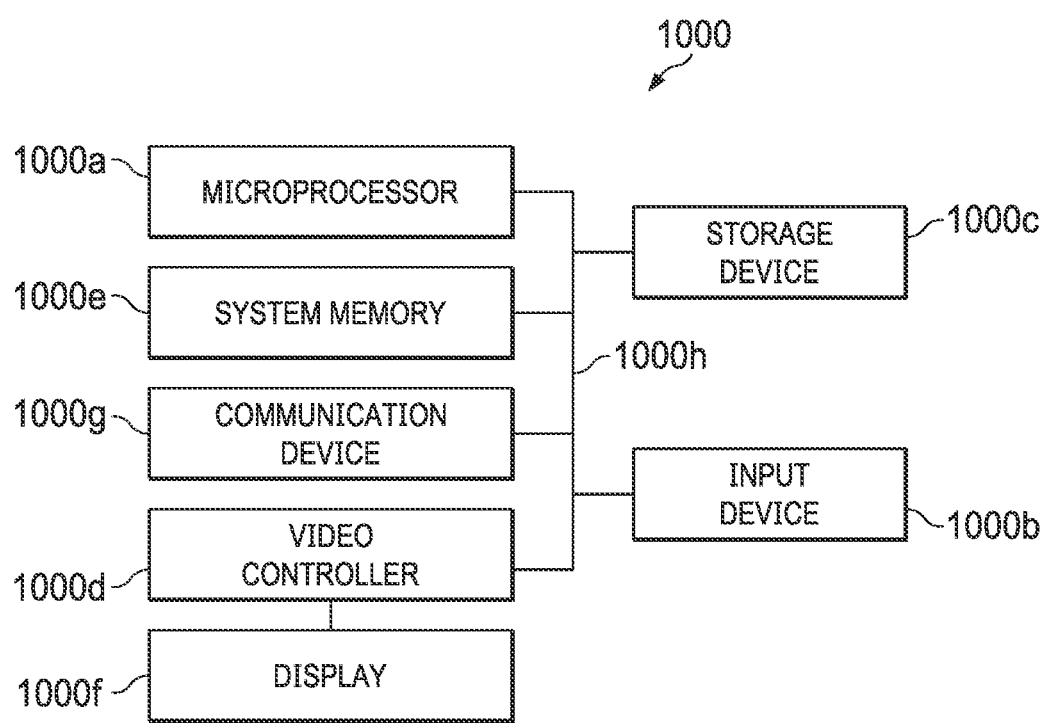
FIG. 11 is a diagrammatic illustration of a node for implementing one or more example embodiments of the present disclosure, according to an example embodiment.

At the step 145, the photo of the user 70 and the other user data is removed from the window 290. Upon confirming that the user 70 has entered the lounge 35, the agent 76 can select the input button 310 to remove the photo 300 of the user 70 and the other user data 305 from the window 290, as illustrated in FIG. 10. This allows the window 290 to display only users that have electronically checked-in to the lounge 35 but that have not yet arrived. In other embodiments, the system 10 can remove the photo 300 of the user 70 and the other user data 305 upon receiving confirmation via GPS that the user has entered the lounge 35. That is, in some embodiments, the agent 76 does not select the input button 310. Instead, the system 10 determines that the user 70 has entered the lounge 35 due to a GPS location of the remote user device 15 of the user 70, and the system 10 removes the photo 300 of the user 70 and the other user data 305 automatically. In some embodiments, the system 10 determines that the user 70 has entered the lounge 35 due to a Bluetooth or Wi-Fi pairing that occurs within the lounge Although the photos 300 in FIG. 10 includes a censor bar (or black bar or censor box) masking the identity of a human face, in operation the photo 300 would not include the censor bar. As illustrated in FIG. 10, selection of the input button 310 removes the photo 300 of the user 70 and the other user data 305 associated with the user 70, but the photo and other user data associated with "Mark Smith" remains displayed on the window 290.

There are many variations to the method 100 and/or the system 10. For example, in some embodiments, the confirmation identifier 285 acts as a time sensitive PIN number that is entered on a keypad coupled to the door 79, which generally remains locked. Upon entering the confirmation identifier 285 using the keypad, the locked door 79 is opened such that the user 70 can enter the lounge 35. In other embodiments, the confirmation number 285 is displayed in the window 290 in place and/or in addition to the photo 300. In some embodiments and when the confirmation number 285 is displayed on the window 290 and the window 280, verification or validation that the user 70 should be granted access to the lounge 35 is based on the user 70 displaying or speaking the confirmation number 285 to the user 76 to verify that the confirmation numbers match.

In some embodiments, the membership number may be or include a frequent flyer number, an industry specific identification number, a social security number, a Transportation Security Administration ("TSA") identifier, and a pre-check or other known traveler number.

In some embodiments, using the system 10 and/or completing at least a portion of the method 100 allows the user 70 to use his or her remote user device 15 as a credential for entering a secured access location, such as an airport lounge. When using the system 10 and/or completing at least a portion of the method 100, the computer 30 does not query the computer 25 to determine whether the user 70 is an active member and whether the user 70 is granted permission to enter the lounge 35. Instead, the query is generated by the remote user device 15 and look-up is performed by the computer 25, which prevents the computer 30 from needing to use memory and processing power to create and send the query. As such, the available memory and processing power of the computer 30 are increased when compared to the available memory and processing power of the computer 30 when the computer 30 is required to create and send a query as to the permission of the user 70. Considering the available memory and processor power of the computer 30 are increased, the system 10 and/or the method 100 improves the functioning of the computer 30 itself.

In some embodiments, using the system 10 and/or completing at least a portion of the method 100 creates a streamlined experience for the user 70. With conventional systems in the technical field of customer service, users or members are required to physically wait in a line to speak to an agent so that the agent can create and send a query regarding whether the user 70 is granted permission to access the lounge 35. This is not ideal for customers. The system 10 and/or the method 100 provides an improvement in the technical field of customer service in that the user 70 is capable of creating and sending his or her own query regarding permission to access the lounge 35. As the creation and query of the request is independent of the computer 30, the system 10 is capable of processing a larger number of queries from a larger number of users. This greatly increases the number of queries processed and increases check-in speed for the members, as the conventional systems require a sequential processing of members. In some embodiments, the use of the system 10 enables more accurate entry of user information and more efficient processing of validation requests (e.g. request to enter the lounge 35).

In one or more example embodiments, each of the applications is stored in the computer readable medium. In some embodiments, the application includes and/or executes one or more web-based programs, Intranet-based programs, and/ or any combination thereof. In an example embodiment, the application includes a computer program including a plurality of instructions, data, and/or any combination thereof. In an example embodiment, the application is written in, for example, HyperText Markup Language (HTML), Cascading Style Sheets (CSS), JavaScript, Extensible Markup Language (XML), asynchronous JavaScript and XML (Ajax), iOS, xCode, Swift, Android for mobile, and/or any combination thereof. In an example embodiment, the application is a web-based application written in, for example, Java or Adobe Flex, which pulls real-time information from another computer and/or a plurality of data sources. In an example embodiment, the application pulls real-time information from the plurality of data sources, upon the execution, opening or start-up of the application. In an example embodiment, the application is stored on the computer readable medium and/or in the database.

In an example embodiment, as illustrated in FIG. 14 with continuing reference to FIGS. 1-10, an illustrative node 1000 for implementing one or more of the example embodiments described above and/or illustrated in FIGS. 1-10 is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several example embodiments, the storage device 1000c may include a thumb drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1-10 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-10 include respective pluralities of same components.

In several example embodiments, one or more of the applications, systems, and application programs described above and/or illustrated in FIGS. 1-10 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces a method of verifying that a first user is authorized to access a secured area via an entry point that is positioned between a first area and the secured area, wherein the method comprises: receiving at a first computer and from a first remote user device that is associated with the first user, information relating to a first check-in request; wherein the information relating to the first check-in request comprises: a first membership number associated with the first user; and a lounge location; wherein the first membership number is associated with a first future travel plan; and wherein the first future travel plan comprises a first travel event that departs from a departure location at a scheduled departure time; generating a first time stamp for the receipt of the information relating to the first check-in request; verifying, using the information relating to the first check-in request and the first computer, that the first user is authorized to enter the secured area; wherein verifying that the first user is authorized to enter the secured area comprises: verifying that the first membership number is a valid membership number; verifying that the departure location is associated with the lounge location; and verifying that the first time stamp is within a window of time prior to the scheduled departure time; and sending, in response to the verification that the first user is authorized to enter the secured area, instructions from the first computer to a second computer positioned near the entry point to display a first window on the second computer, wherein the first window includes user information associated with the first user. In one embodiment, the first remote user device comprises a graphical user interface that is configured to display a plurality of windows; wherein receiving the information relating to a first check-in request comprises: displaying a second window on the graphical user interface of the first remote user device, wherein the second window is configured to receive the information relating to a first check-in request; receiving, by the first remote user device, the information relating to a first check-in request. In one embodiment, the first travel event is a flight; and wherein the departure location is an airport; and wherein the departure location is associated with the lounge location when the lounge location is within the airport. In one embodiment, the method further comprises: receiving at the first computer, a plurality of check-in requests from a plurality of remote user devices; wherein the first check-in request is one of the plurality of check-in requests; wherein the first remote user device is one of the plurality of remote user devices; and verifying, using the first computer and based on the plurality of check-in requests, that a plurality of users is authorized to enter the secured area; wherein the first user is one of the plurality of users that is authorized to enter the secured area; and wherein the window displayed on the second computer includes user information associated with each user in the plurality of users authorized to enter the secured area. In one embodiment, the first remote user device comprises a graphical user interface that is configured to display a plurality of windows; wherein the method further comprises displaying, after verifying that the first user is authorized to enter the secured area, a third window on the graphical user interface of the first remote user device; and wherein the third window includes a confirmation of remote check-in of the first user to the secured area. In one embodiment, the method also includes granting the first user access to the secured area based on the user information associated with the first user displayed on the second computer and further based on the third window being displayed that includes the confirmation of remote check-in of the first user; wherein the user information associated with the first user comprises a photo of the first user. In one embodiment, the first window further includes a first tab, the selection of which removes the user information associated with the first user from the first window; and wherein the method further comprises removing the user information associated with the first user from the first window in response to selection of the first tab. In one embodiment, the method also includes displaying a fourth window on the first remote user device, wherein the fourth window displays an illustration of a map of an area in which the first remote user device is located; wherein the map comprises an illustration of the secured area and a second selectable tab associated with a remote check-in of the first user; receiving an indication that the second selectable tab associated with the remote check-in of the first user has been selected; and displaying the second window in response to the receipt of the indication that the second selectable tab associated with the remote check-in of the first user has been selected. In one embodiment, the illustration of the map of the area is generated based on the located of the first remote user device. In one embodiment, the method also includes: displaying a fifth window on the first remote user device, wherein the fifth window displays a listing of search results; wherein the listing of search results comprises a third selectable tab associated with remote check-in of the first user to the secured area; receiving an indication that the third selectable tab has been selected; and displaying the second window in response to the receipt of the indication that the third selectable tab has been selected.

The present disclosure introduces a system for verifying that a first user is authorized to access a secured area via an entry point that is positioned between a first area and the secured area, the system comprising: a first computer associated with the entry point, wherein the first computer comprises a graphical user interface that is configured to display a first window; one or more processors operably coupled to a non-transitory computer readable medium; and a plurality of instructions stored on the non-transitory computer readable medium, wherein when the instructions are executed with at least one processor, the following steps are executed: receiving at a second computer and from a first remote user device that is associated with the first user, information relating to a first check-in request; wherein the information relating to the first check-in request comprises: a first membership number associated with the first user; and a lounge location; wherein the first membership number is associated with a first future travel plan; and wherein the first future travel plan comprises a first travel event that departs from a departure location at a scheduled departure time; generating a first time stamp for the receipt of the information relating to the first check-in request; verifying, using the information relating to the first check-in request and the second computer, that the first user is authorized to enter the secured area; wherein verifying that the first user is authorized to enter the secured area comprises: verifying that the first membership number is a valid membership number; verifying that the departure location is associated with the lounge location; and verifying that the first time stamp is within a window of time prior to the scheduled departure time; and sending, in response to the verification that the first user is authorized to enter the secured area, instructions from the second computer to the first computer to display a first window on the first computer, wherein the first window includes user information associated with the first user. In one embodiment, the first remote user device comprises a graphical user interface that is configured to display a plurality of windows; wherein receiving the information relating to a first check-in request comprises: displaying a second window on the graphical user interface of the first remote user device, wherein the second window is configured to receive the information relating to a first check-in request; receiving, by the first remote user device, the information relating to a first check-in request. In one embodiment, the first travel event is a flight; and wherein the departure location is an airport and wherein the departure location is associated with the lounge location when the lounge location is within the airport. In one embodiment, when the instructions are executed with at least one processor, the following steps are also executed: receiving at the second computer a plurality of check-in requests from a plurality of remote user devices; wherein the first check-in request is one of the plurality of check-in requests; and wherein the first remote user device is one of the plurality of remote user devices; and verifying, using the second computer and based on the plurality of check-in requests, that a plurality of users is authorized to enter the secured area; wherein the first user is one of the plurality of users that is authorized to enter the secured area; and wherein the window displayed on the second computer includes user information associated with each user in the plurality of users authorized to enter the secured area; wherein at least one of the one or more processors is part of the first computer associated with the entry point; and wherein the execution of instructions improves available memory of the first computer. In one embodiment, the first remote user device comprises a graphical user interface that is configured to display a plurality of windows; wherein when the instructions are executed with at least one processor, the following step is also executed: displaying, after verifying that the first user is authorized to enter the secured area, a third window on the graphical user interface of the first remote user device; and wherein the third window includes a confirmation of remote check-in of the first user to the secured area. In one embodiment, when the instructions are executed with at least one processor, the following step is also executed: granting the first user access to the secured area based on the user information associated with the first user displayed on the first computer and further based on the third window being displayed that includes the confirmation of remote check-in of the first user; wherein the user information associated with the first user comprises a photo of the first user. In one embodiment, the first window further includes a first tab, the selection of which removes the user information associated with the first user from the first window; and wherein when the instructions are executed with at least one processor, the following step is also executed: removing the user information associated with the first user from the first window in response to selection of the first tab. In one embodiment, when the instructions are executed with at least one processor, the following steps are also executed: displaying a fourth window on the first remote user device, wherein the fourth window displays an illustration of a map of an area in which the first remote user device is located; wherein the map comprises an illustration of the secured area and a second selectable tab associated with a remote check-in of the first user; receiving an indication that the second selectable tab associated with the remote check-in of the first user has been selected; and displaying the second window in response to the receipt of the indication that the second selectable tab associated with the remote check-in of the first user has been selected. In one embodiment, the illustration of the map of the area is generated based on the located of the first remote user device. In one embodiment, when the instructions are executed with at least one processor, the following steps are also executed: displaying a fifth window on the first remote user device, wherein the fifth window displays a listing of search results; wherein the listing of search results comprises a third selectable tab associated with remote check-in of the first user to the secured area; receiving an indication that the third selectable tab has been selected; and displaying the second window in response to the receipt of the indication that the third selectable tab has been selected.

In several example embodiments, the elements and teachings of the various illustrative example embodiments may be combined in whole or in part in some or all the illustrative example embodiments. In addition, one or more of the elements and teachings of the various illustrative example embodiments may be omitted, at least in part, and/or combined, at least in part, with one or more of the other elements and teachings of the various illustrative embodiments.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What we claim is:

1. A method of verifying that a user is authorized to access a secured area via an entry point, wherein the method comprises:
   receiving at a first computer and from a remote user device that is associated with the user, information relating to a check-in request;
      wherein the information relating to the check-in request comprises an event time for an event;
   generating a time stamp for the receipt of the information relating to the check-in request;
   verifying, using the information relating to the check-in request and the first computer, that the user is authorized to enter the secured area;
      wherein verifying that the user is authorized to enter the secured area comprises:
         verifying that the event is associated with the secured area; and
         verifying that the time stamp is within a window of time relative to the event time; and
   sending, in response to the verification that the user is authorized to enter the secured area and from the first computer, confirmation of remote check-in of the user to at least one of: the remote user device or a second computer positioned near the entry point.

2. The method of claim 1,
   wherein the confirmation of remote check-in comprises user data; and
   wherein the user data is sent to the second computer to confirm that a person attempting to enter the secured area is the user.

3. The method of claim 2,
   wherein the user data associated with the user comprises a photo of the user;
   wherein the method further comprises sending, from the first computer and to the second computer, instructions to display a first window on the second computer, wherein the first window includes the photo of the user; and
   wherein the photo of the user displayed in the first window of the second computer provides visual confirmation that the person attempting to enter the secured area is the user.

4. The method of claim 1,
   wherein the confirmation of remote check-in of the user is sent to the remote user device;
   wherein the remote user device comprises a graphical user interface that is configured to display a plurality of windows;
   wherein the method further comprises displaying, after the remote user device receives the confirmation of remote check-in of the user, a second window on the graphical user interface of the remote user device;
   wherein the second window includes the confirmation of remote check-in of the user to the secured area; and
   wherein the confirmation of remote check-in displayed in the second window of the remote user device provides visual confirmation that a person attempting to enter the secured area is the user.

5. The method of claim 4,
   wherein the confirmation of remote check-in of the user is sent to the second computer;
   wherein the method further comprises displaying, after the second computer receives the confirmation of remote check-in of the user, a third window on the graphical user interface of the second computer;
   wherein the third window includes the confirmation of remote check-in of the user to the secured area; and
   wherein the confirmation of remote check-in displayed in the third window of the second computer also provides visual confirmation that the person attempting to enter the secured area is the user.

6. The method of claim 1, further comprising prepopulating portions of the check-in request sent from the remote user device based on a location of the remote user device, wherein the location is determined based on GPS capabilities of the remote user device.

7. The method of claim 1, further comprising identifying, by the remote user device, the user using any one or more of a fingerprint of the user, a facial scan of the user, or an eye scan of the user.

8. The method of claim 1, further comprising identifying, by the first computer, the user using any one or more of a fingerprint of the user, a facial scan of the user, or an eye scan of the user.

9. The method of claim 1,
   wherein the event is a flight;
   wherein the time of the event is a departure time of the flight; and
   wherein the secured area is a lounge within an airport from which the flight is departing.

10. The method of claim 1,
   wherein the information relating to the check-in request further comprises a membership number; and
   wherein verifying that the user is authorized to enter the secured area further comprises verifying that the membership number is a valid membership number.

11. A system configured to verify that a user is authorized to access a secured area via an entry point, the system comprising a non-transitory computer readable medium having stored thereon a plurality of instructions, wherein the instructions are executed with one or more processors so that the following steps are executed:
   receiving at a first computer and from a remote user device that is associated with the user, information relating to a check-in request;
      wherein the information relating to the check-in request comprises an event time for an event;
   generating a time stamp for the receipt of the information relating to the check-in request;
   verifying, using the information relating to the check-in request and the first computer, that the user is authorized to enter the secured area;

wherein verifying that the user is authorized to enter the secured area comprises:
 verifying that the event is associated with the secured area; and
 verifying that the time stamp is within a window of time relative to the event time; and
sending, in response to the verification that the user is authorized to enter the secured area and from the first computer, confirmation of remote check-in of the user to at least one of: the remote user device or a second computer positioned near the entry point.

12. The system of claim 11,
wherein the confirmation of remote check-in comprises user data; and
wherein the user data is sent to the second computer to confirm that a person attempting to enter the secured area is the user.

13. The system of claim 12,
wherein the user data associated with the user comprises a photo of the user;
wherein the instructions are executed with the one or more processors so that the following step is also executed:
 sending, from the first computer and to the second computer, instructions to display a first window on the second computer, wherein the first window includes the photo of the user; and
wherein the photo of the user displayed in the first window of the second computer provides visual confirmation that the person attempting to enter the secured area is the user.

14. The system of claim 11,
wherein the confirmation of remote check-in of the user is sent to the remote user device;
wherein the remote user device comprises a graphical user interface that is configured to display a plurality of windows;
wherein the instructions are executed with the one or more processors so that the following step is also executed:
 displaying, after the remote user device receives the confirmation of remote check-in of the user, a second window on the graphical user interface of the remote user device;
wherein the second window includes the confirmation of remote check-in of the user to the secured area; and
wherein the confirmation of remote check-in displayed in the second window of the remote user device provides visual confirmation that a person attempting to enter the secured area is the user.

15. The system of claim 14,
wherein the confirmation of remote check-in of the user is sent to the second computer;
wherein the instructions are executed with the one or more processors so that the following step is also executed:
 displaying, after the second computer receives the confirmation of remote check-in of the user, a third window on the graphical user interface of the second computer;
wherein the third window includes the confirmation of remote check-in of the user to the secured area; and
wherein the confirmation of remote check-in displayed in the third window of the second computer also provides visual confirmation that the person attempting to enter the secured area is the user.

16. The system of claim 11, wherein the instructions are executed with the one or more processors so that the following step is also executed: prepopulating portions of the check-in request sent from the remote user device based on a location of the remote user device, wherein the location is determined based on GPS capabilities of the remote user device.

17. The system of claim 11, wherein the instructions are executed with the one or more processors so that the following step is also executed: identifying, by the remote user device, the user using any one or more of a fingerprint of the user, a facial scan of the user, or an eye scan of the user.

18. The system of claim 11, wherein the instructions are executed with the one or more processors so that the following step is also executed: identifying, by the first computer, the user using any one or more of a fingerprint of the user, a facial scan of the user, or an eye scan of the user.

19. The system of claim 11,
wherein the event is a flight;
wherein the time of the event is a departure time of the flight; and
wherein the secure area is a lounge within an airport from which the flight is departing.

20. The system of claim 11,
wherein the information relating to the check-in request further comprises a membership number; and
wherein verifying that the user is authorized to enter the secured area further comprises verifying that the membership number is a valid membership number.

* * * * *